(12) United States Patent
Ito et al.

(10) Patent No.: US 6,464,146 B2
(45) Date of Patent: Oct. 15, 2002

(54) METHOD OF INPUTTING INFORMATION ABOUT A CARD, APPARATUS FOR PROCESSING INFORMATION ABOUT A CARD, AND COMPUTER PRODUCT

(75) Inventors: Toshiyuki Ito, Kawasaki (JP); Susumu Terasaka, Kawasaki (JP); Yoshihiro Matsubara, Ishikawa (JP)

(73) Assignees: Fujitsu Limited, Kawasaki (JP); PFU Limited, Ishikawa (JP)

( * ) Notice: Subject to any disclaimer, the term of this patent is extended or adjusted under 35 U.S.C. 154(b) by 0 days.

(21) Appl. No.: 09/907,696

(22) Filed: Jul. 19, 2001

(65) Prior Publication Data

US 2002/0121544 A1 Sep. 5, 2002

(30) Foreign Application Priority Data

Mar. 2, 2001 (JP) ........................................ 2001-059181

(51) Int. Cl.[7] .............................................. G06K 19/06
(52) U.S. Cl. ........................ 235/492; 235/379; 235/380
(58) Field of Search ................................ 235/492, 379, 235/380

(56) References Cited

U.S. PATENT DOCUMENTS 5,671,374 A * 9/1997 Postman et al. ............ 235/492

FOREIGN PATENT DOCUMENTS

JP 6227597 * 12/1994

* cited by examiner

*Primary Examiner*—Harold I. Pitts
(74) *Attorney, Agent, or Firm*—Staas & Halsey LLP

(57) ABSTRACT

The system according to the present invention includes the server and the client apparatus connected through a network. The server identifies the type of the card based on the a few figures of the card number input by the user. Furthermore, the server obtains image data of the card and positions of items printed or embossed on the card based on the identified card. The image data and the positions of items has already been stored with the server. Then the server generates a data for displaying an input assistance screen based on the image data and the positions of items and transmits the generated data to the client apparatus where the input assistance screen is displayed.

9 Claims, 8 Drawing Sheets

FIG.9

CARD INFORMATION DB

| CARD INDENTIFIER | CARD ISSUING COMPANY NAME | CARD COMPANY NAME | MEMBERSHIP NUMBER POSITION | VALID TERM POSITION | ... |
|---|---|---|---|---|---|
| | | | | | |

ARROW INDICATION INFORMATION DB

| CARD INDENTIFIER | ARROW INDICATION INFORMATION FOR MEMBERSHIP NUMBER POSITION | ARROW INDICATION INFORMATION FOR VALID PERIOD POSITION | ... |
|---|---|---|---|
| | | | |

106c

METHOD OF INPUTTING INFORMATION ABOUT A CARD, APPARATUS FOR PROCESSING INFORMATION ABOUT A CARD, AND COMPUTER PRODUCT

FIELD OF THE INVENTION

The present invention relates to a technology that prevents occurrence of mistakes when inputting information on a credit card during electronic transactions.

BACKGROUND OF THE INVENTION

Conventionally, electric settlement using a credit card has often been performed in on-line-shopping so that a user can access to websites of electronic shops or an electronic shopping mall or the like via the Internet.

However, there are following drawbacks in such a system. It is common for a user to make mistakes when inputting necessary data in the form or the like on the website. If the number of times for which the input mistakes are made increases, naturally the load on the computer system that hosts the website increases because each time it has to check the input data.

This problem will be explained below more concretely. There are different types and designs of credit cards depending upon the purpose of the card and the card issuing company. It is almost difficult for the user to intuitively grasp which portion in his/her own credit card should he/she see when inputting data.

Therefore, the time required to input the data is apt to become longer, so that a terminal device (node) such as a personal computer of the user is connected to the computer system hosting the website longer. If there is concentration of transactions, and if there are users who are connected to the computer system just because they are taking longer time to input data, the computer system gets overloaded and may crash.

Furthermore, users often make mistakes when inputting particularly the numbers. Basically the user cannot intuitively grasp which data on his/her card is to be input. Errors occur more often when inputting a date such as yy/mm/dd (year/month/date) denoting a valid period of the card is usually represented in order of first, month and secondly, year on the card, so that there would significantly occur a number of inputting errors. As a result, the connection time between the user and the computer system that hosts the website will become longer. Also, the computer system is required to perform error processing each time the user submits wrong data. This eventually increases the load on the computer system.

Such problems will especially occur on on-line-shopping providing websites such as on websites which sale of tickets of popular concerts or sale popular products etc.

Like this, the conventional system has several problems and it is inconvenient and insufficient for both the user and the manager of the on-line-shopping.

Of course, the above mentioned problems exist not only in a system that requires input of data on the credit cards but also in any other systems that require input of information presented on a card having a predetermined format.

SUMMARY OF THE INVENTION

It is an object of the present invention to provide a method of inputting information about a card, an apparatus for processing information about a card, and a computer product in which input error can be prevented when inputting information about a card.

According to the method and apparatus of one aspect of the present invention, the method is executed on a card information input system. The card information input system includes a card information inputting terminal with which an user inputs information related to his/her card and a card information processing apparatus that processes the information related to the card. The card information inputting terminal and card information processing apparatus are connected to each other through a network. An image data of the card is first obtained. Positional information which is an information related to positions of items printed or embossed on the card is acquired based on the obtained image data. Finally, an image data for displaying an input assistance screen is generated, based on the image data and the positional information, that assists the user when inputting personal information that has been printed or embossed on the card.

According to a method and apparatus of another aspect of the present invention, an image data for displaying an input assistance screen, that has been generated by the card information processing apparatus based on an image data of the card and positional information which is an information related to positions of items printed or embossed on the card, is received from the card information processing apparatus. Moreover, the image data for displaying the input assistance screen is displayed. Therefore, input error can be prevented when inputting personal information printed on the card. Further, an input error can be prevented thereby reducing a load of whole of system. Furthermore, fault of convenience of transactions can be avoided owing to lowering of the system.

According to still another aspect of the present invention, there is provided a computer program which when executed realizes the method according to the present invention on a computer.

Other objects and features of this invention will become apparent from the following description with reference to the accompanying drawings.

BRIEF DESCRIPTION OF THE DRAWINGS

FIG. 9 shows a storage content in the card information database 106*b*.

FIG. 10 shows an example of storage content in the arrow information database.

DESCRIPTION OF THE PREFERRED EMBODIMENTS

Embodiments of a method of inputting information about card, an apparatus for processing information about card, and a computer program for realizing the method according to the present invention on a computer according to the present invention will be explained in detail below by referring to the accompanying drawings. It goes without saying that this invention cannot be limited to these embodiments. Particularly, though the present invention will be explained about an example in which this invention applies to a system for inputting information about a credit card, this invention is not limited to this example. For example, this invention can be applied to any system information on a card having a predetermined format is input.

First, the present system will be explained in summary. Secondly, the construction and the processing and the like of the present system will be explained in detail.

Figure 1:
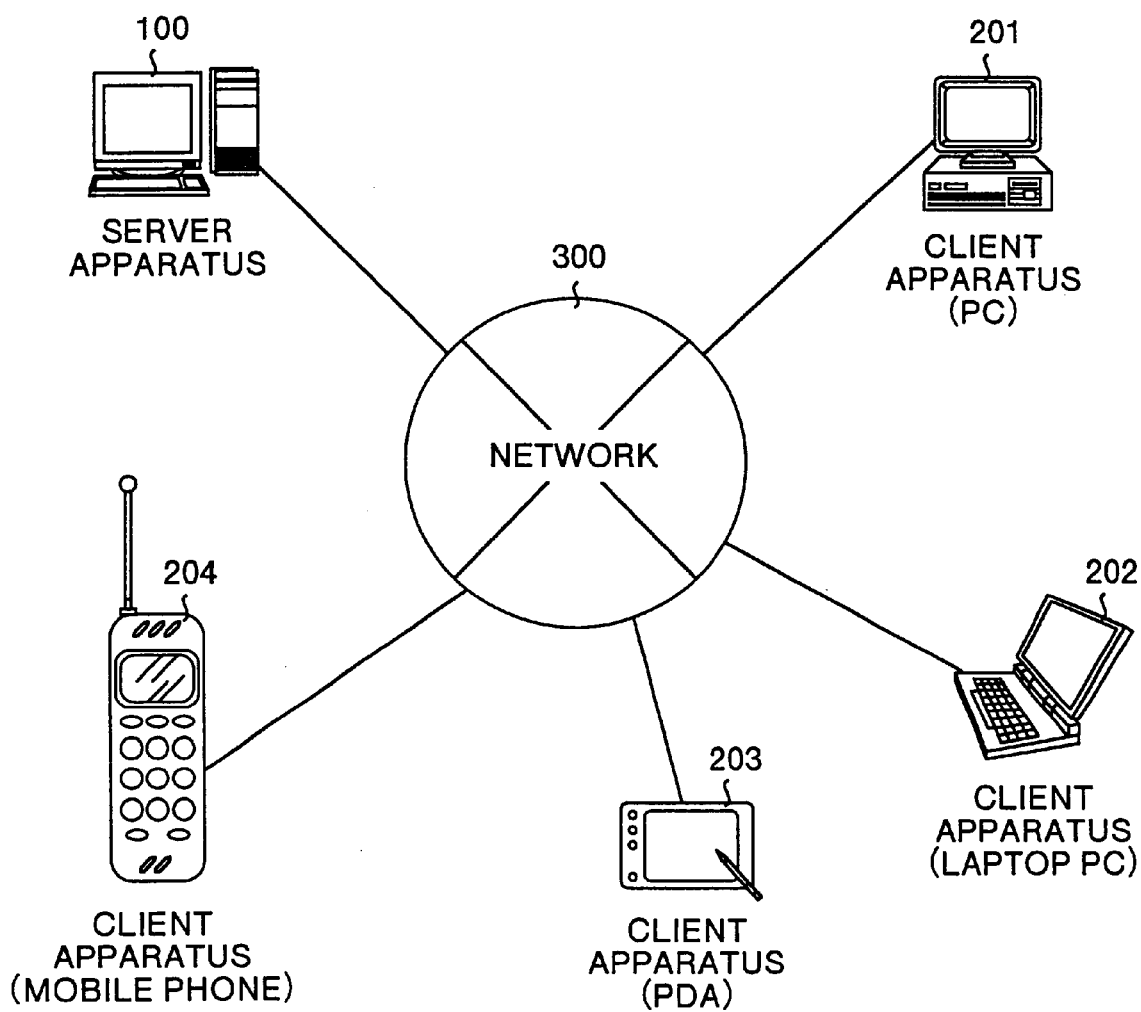
FIG. 1 shows a block diagram of an example of whole construction of the present system.

FIG. 1 is a block diagram of an example of construction of the present invention. Only those portions are shown that are related to the functioning of the present invention.

This system essentially includes the server 100 and the client apparatuses 201 to 204 connected to the network 300. The server 100 is a card information processing apparatus for processing information related to the credit card. The client apparatuses 201 to 204 are devices for inputting, by the user, the information related to their credit cards.

In this system, basically, transactions using the credit card can be performed between the server 100 and the client apparatuses 201 to 204 through a website of an electronic shop, electronic shopping mall and the like. Personal information of the owner of the card, that is printed or embossed on the card, is transmitted from the client apparatuses 201 to 204 to the server 100 by way of the network 300.

The personal information of user is, for example, card number and the valid period.

A construction of the above system will be explained for realizing such basic characteristic.

Figure 2:
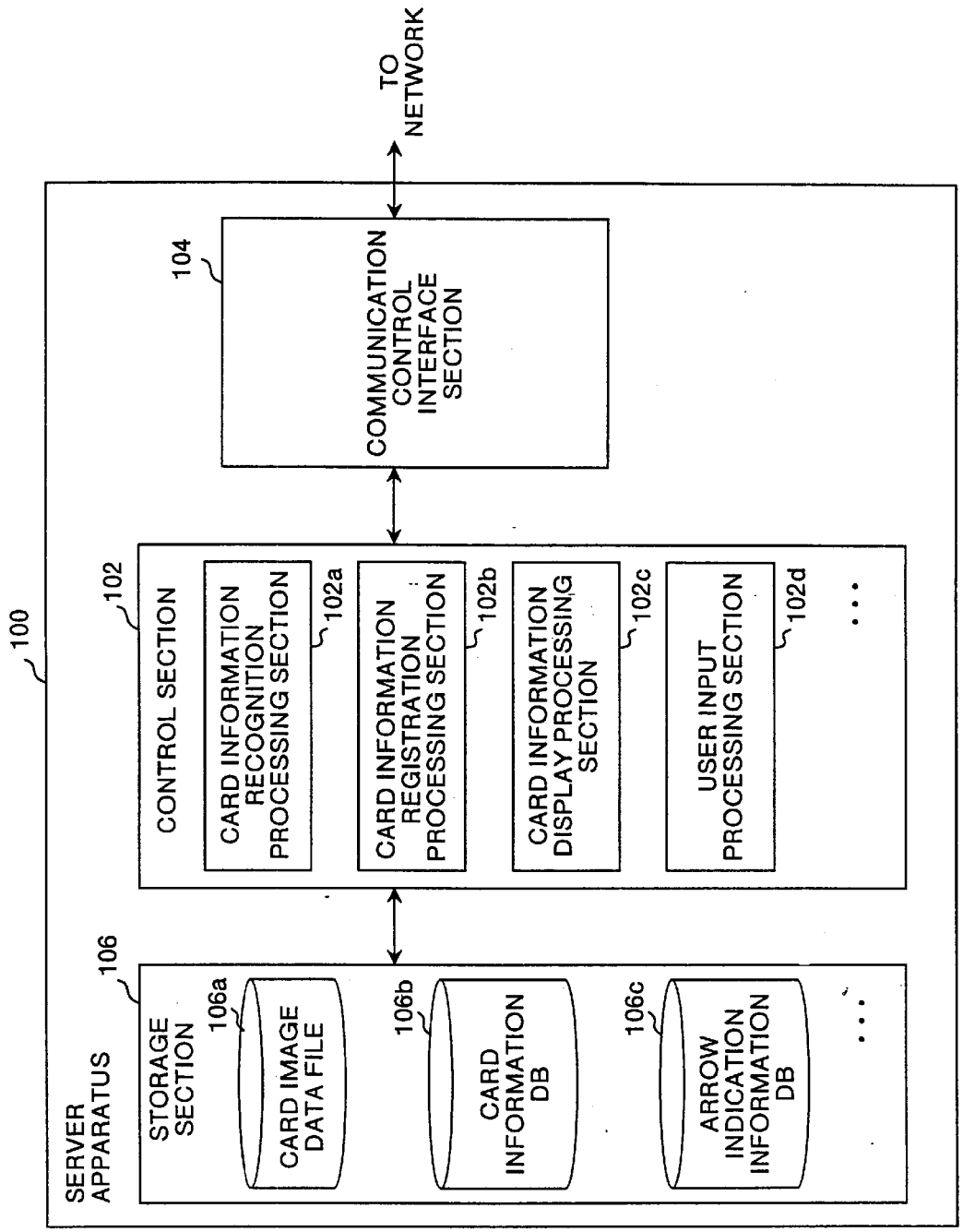
FIG. 2 shows a block diagram of an example of construction of server apparatus 100 to which the present invention applies.

First, construction of the server 100 will be explained. FIG. 2 shows a block diagram of an example of the construction of the server 100 to which the present invention is applied. Only those portion that are related to the functioning of the present invention are shown conceptually. The server 100 includes the control section 102 such as a CPU (Central Processing Unit) which controls the entire operation of the server 100. The server 100 also includes the communication control interface section 104 which is connected to a communications apparatus that has not been shown in this figure. The communications apparatus may be a device such as a router. The communication control interface section 104 and the communications apparatus may be connected to each other through, for example, a communication line. The server 100 also includes the storage section 106 which stores various databases such as the card image data file 106*a*, card information database 106*b*, and arrow indication information database 106*c*. The storage section 106, control section 102, and the communication control interface section 104 are connected mutually so that they can perform communication between each other. Moreover, the server 100 is connected to a network through the communications apparatus. The communications apparatus may be connected to the network through dedicated line or radio communications.

The storage section 106 is for example a hard disk and it stores various computer programs, tables, files, databases and files for webpages used for various kinds of processing and website provision.

The card image data file 106*a* stores information relating to card image data and a card identifier which unitarily identifies the credit card. The card image data is data is image data of the design of the credit card. Other information may be stored in the card image data file 106*a*.

The card information database 106*b* stores information relating to the credit card. The information stored in the card information database 106*b* includes the card identifier, name of the card issuing company, name of the card company, a position at which membership number of the user is printed or embossed, a position at which the valid period of the card is printed or embossed. These items are stored in correlation with each other. Other information may be stored in the card information database 106*b*.

The arrow indication information database 106*c* includes information regarding an arrow which is displayed for giving assistance to the user when the user inputs information about his/her credit card on a webpage. For example, the arrow may be displayed in such a manner that it points the position at which the membership number of the user is printed or embossed when the user is inputting the membership number. The information stored in the arrow indication information database 106*c* includes the card identifier and image data of arrows stored in correlation with each other. The image data of arrows includes image data that is to be displayed when pointing the position of the membership number, and image data that is to be displayed when pointing the position of the valid period. Other information may be stored in the arrow indication information database 106*c*.

The storage section 106 may store files and CGI programs which are required to maintain the website that provides service to the client apparatuses 201 to 204.

Furthermore, the communication control interface section 104 performs communication-control between the server 100 and the network 300 or the communication device. The communication control interface section 104 has a function for communicating data with other terminal devices by way of the communication line or radio communications.

Although not shown in the drawings, a memory is provided to the control section 102. This memory stores a control program for controlling OS (operating system), a program in which various procedure order or the like is defined, and desired data. The control section 102 performs an information processing for performing various processes. The control section 102 is functionally provided with the card information recognition processing section 102*a*, card information registration processing section 102*b*, card information display processing section 102*c*, and the user input processing section 102*d*.

The card information recognition processing section 102*a* obtains image data of a credit card to perform image analysis and automatically recognizes each of items represented on the credit card to obtain the positional information and the like.

The card information registration processing section 102*b* registers each of items represented on a credit card and the positional information into a predetermined database in the storage section 106.

The card information display section 102c has information about the credit card which is displayed on the webpage for inputting the information about the credit card.

The user input processing section 102d performs a process when the user inputs the information about his/her credit card.

Details of processing performed by the card information recognition processing section 102a, card information registration processing section 102b, card information display processing section 102c, and the user input processing section 102d will be explained later.

As shown in FIG. 1, the client apparatus 201 is a personal computer, the client apparatus 202 is a laptop computer, the client apparatus is a PDA, and the client apparatus 204 is a mobile telephone. Each of the client apparatus is basically provided with a control section, a ROM, a RAM, a hard disk, an input device, an output device, an input and output control interface, and a communication control interface. They are connected one another so that data communication can be mutually performed.

The control section of the client apparatus is provided with computer softwares such as a browser and a mailer. The browser software basically performs display control (browsing process) in that the browser interprets web data and makes the below-mentioned monitor display the data. The mailer software performs transmission and reception of an electronic mails under a predetermined communication protocol such as SMTP (Simple Mail Transfer Protocol).

The input device of the client apparatus may be a keyboard, mouse or a microphone. The below-mentioned monitor realizes a pointing device function in cooperation with the mouse.

The output device of the client apparatus may be a monitor such as a home television set, CRT, liquid crystal display or a plasma display. A speaker may also be used as the output device. The output device will be simply referred to as a monitor.

The communication control interface of the client apparatus performs communication control between other client apparatuses and the Internet. The communication control interface is for connecting to the network 300.

The client apparatus is connected to the Internet by way of a telephone line or a dedicated line using a communication device such as a modem, a terminal adaptor, or a router etc. The client apparatus can access to the server 100 under a predetermined communication protocol such as TCP/IP internet protocol.

The network 300 is such that it mutually connects the server 100 and the client apparatuses 201 to 204. The network 300 is, for example, the Internet.

An example of various processing performed by the present system will be explained while referring to FIG. 3 to FIG. 10.

Figure 3:
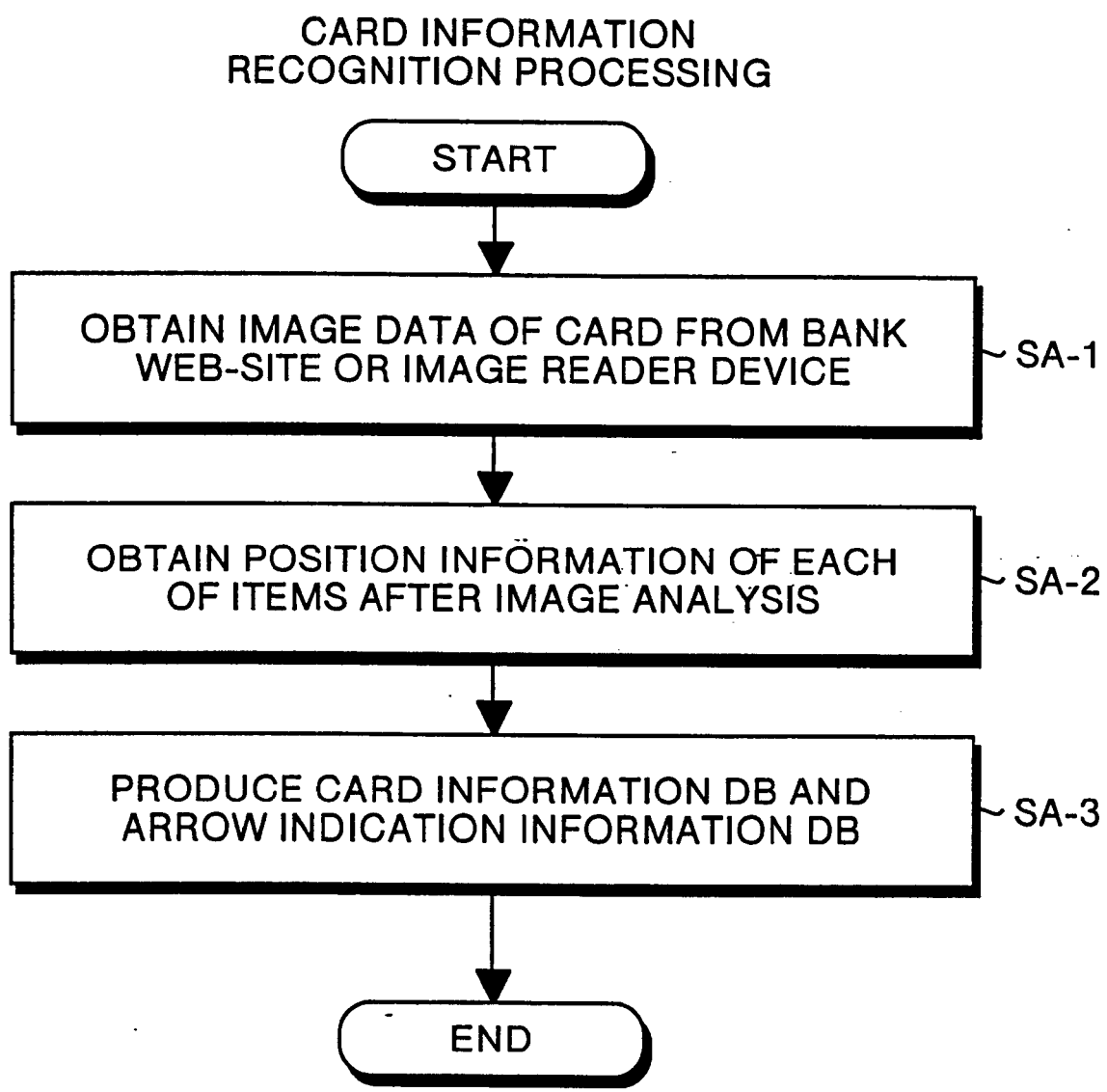
FIG. 3 shows a flow chart of an example of the card information recognition processing of the present system embodiment.

The card information recognition processing will be explained in detail while referring to FIG. 3. FIG. 3 shows a flow chart of the card information recognition processing.

At step SA-1, the server 100 obtains image data of a credit card by processing of the card information recognition processing section 102a. The card information recognition processing section 102a accesses to a website of a card issuing company such as a bank or a credit card company and obtains image data of the credit card. If there is no image data in the website, an image of the credit card may be fetched from an image input device such as an image scanner connected to the server 100 thereby producing the image data. The produced image data of the credit card is stored into the card image data file 106a in association with the card identifier.

At step SA-2, the card information recognition processing section 102a performs image analysis of the obtained image data of the credit card. This image analysis includes character recognition of the items such as the name of the card issuing company, name of the card company, membership number, and the valid period that are printed or embossed on the credit card as well as the positional information of these items. The positional information is, for example, coordinate of start and end of the item.

The card information recognition processing section 102a may detect and obtain a character sequence in coincidence with the character sequence comprising candidates of a issuing company name and a card company name beforehand stored in the storage section 106 from the character sequence recognized using image analysis regarding as the issuing company name and the card company name.

The card information recognition processing section 102a may obtain a character sequence of "membership number" form the character sequence recognized using image analysis.

The card information recognition processing section 102a may obtain a character sequence of "membership" from the character sequence recognized using image analysis regarding as a positional information of the membership number and obtain a position of numerical sequence of sixteen figures (four numerical sequences of four figures) represented at the below side.

The card information recognition processing section 102a may obtain a positional information of the valid period by obtaining a character sequence of "valid period" from the character sequence using image analysis and detecting two figure characters, a slash(/) represented below the character sequence of "valid period" and positions of the two figure characters.

If a card image information is constituted by definition unit which is stated using XML etc., a position of numerical sequence of a membership and a valid period may be obtained by referring to the tag or the like.

At Step SA-3, the card information registration section 102b of the server 100 produces the card information database 106b based on the information recognized at the step SA-2.

FIG. 9 shows an example of content of storage in the card information database 106b. As shown in FIG. 9, the card information database 106b stores the card identifier, name of the card issuing company, name of the card company, position at which the membership number is printed or embossed on the credit card, position at which the valid period is printed or embossed on the credit card.

The card information registration processing section 102b of the server 100 produces arrow indication information which is a positional information, for displaying an arrow for assisting the user when he/she inputs information about the credit card on a form in webpage, based on positional information of each of items obtained at the Step SA-2. The card information registration processing section 102b makes the arrow indication information database 106c store this arrow indication information.

FIG. 10 shows an example of content of storage in the arrow indication information database 106c. As shown in FIG. 10, the arrow indication information database 106c stores the card identifier, arrow indication information related to the position of the membership number, and arrow indication information related to the position of the valid period.

The card information registration processing section 102b produces an arrow's positional information and registers the information into the arrow indication information database 106c so that a position of each of items can be properly indicated using an arrow when arrow image data beforehand stored in the storage section 106 of the server 100 are overlapped onto card image data and displayed. Thereby the card information recognition process is completed.

Figure 4:
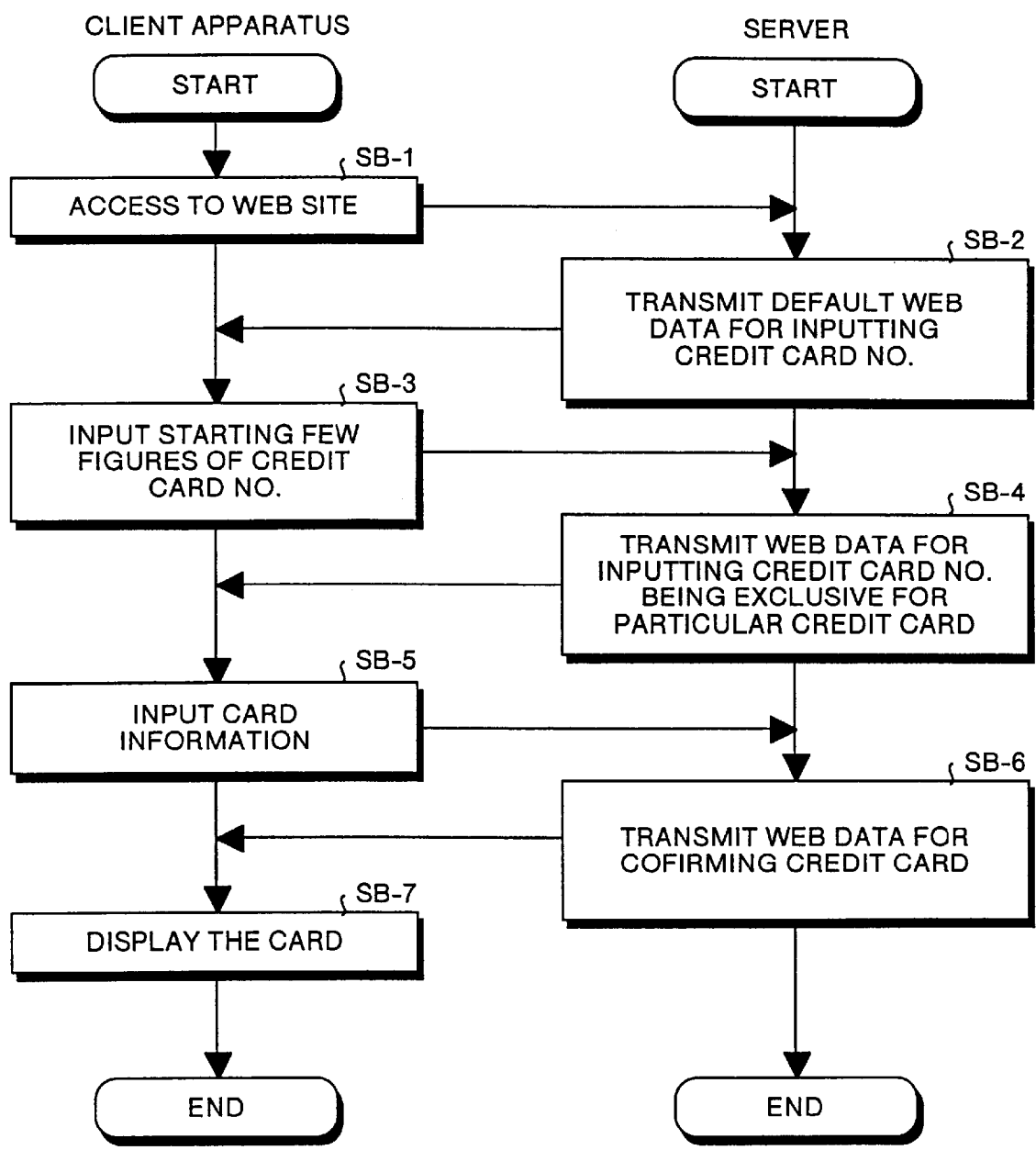
FIG. 4 shows a flow chart of an example of the user card information input processing of the present system embodiment.

The process when the user inputs information about his/her credit card will be explained in detail while referring to FIG. 4. FIG. 4 shows a flowchart of this process.

At step SB-1, the client apparatus (which may be any of the client apparatuses 201 to 204) connects itself to the server 100 over the Internet. Such a connection may be established by inputting URL of the website provided by the server 100 in the browser software. The URL maybe input using the input device. The methods for accessing a server over the Internet are well know, therefore, there explanation will be omitted.

As Step SB-2, the server 100 transmits default website data for inputting the credit card number to the client device. The default website data has been prepared beforehand and stored in the storage section 106. Thus, a default webpage for inputting the credit card number is displayed on the monitor of the client apparatus by the browser software in the client apparatus.

Figure 5:
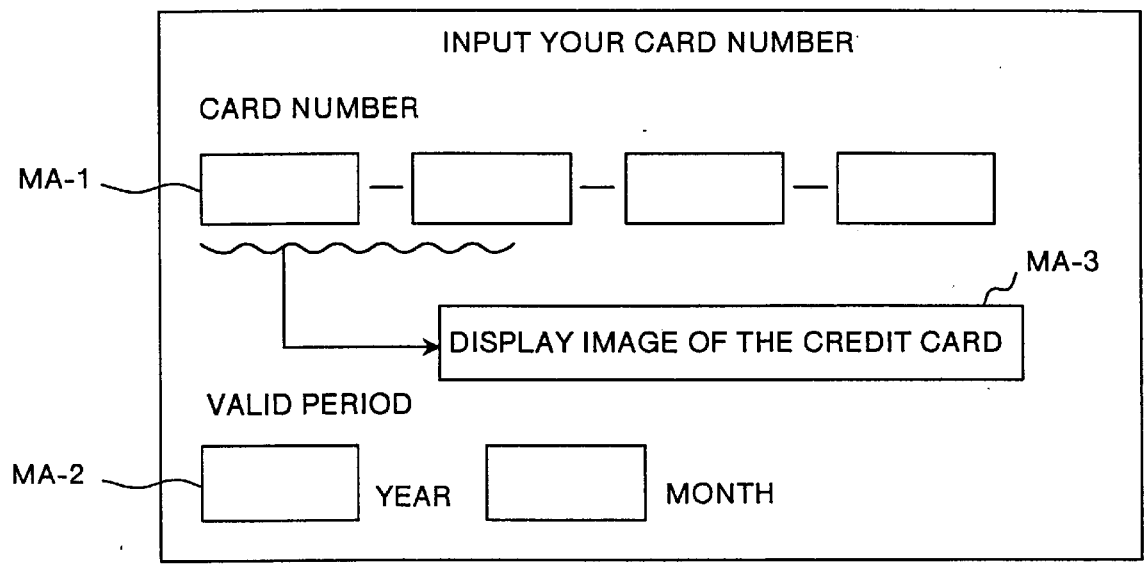
FIG. 5 shows an example of display screen of default credit card number inputting webpage which is displayed on the monitor of the client apparatuses 201 to 204.

FIG. 5 shows an example of display of the default webpage for inputting the credit card number. This display includes the area MA-1 for inputting the credit card number, area MA-2 for inputting the valid period, and the button MA-3 that is pressed when an image of the credit card is to be displayed.

At step SB-3, the user inputs some of the starting figures of the card number and presses the button MA-3. Input of the credit card number and pressing of the button may be performed by using the input device such as the keyboard or mouse provided to the client device. The credit card number is transmitted fro the client apparatus to the server 100.

The credit card number is defined, for example, in "ISO/IEC 7812-1 Third edition (1993-12-01)" standard. In this standard, the first figure represents a credit card company (MII), the second to sixth figures represent a card issuing company, the seventh to twelfth figures represent personal identification number, and the sixteenth figure is a check digit. Thus, if first six figures of the credit card number can be discriminated then the type of the credit card can be identified. Therefore, as shown by a wave in FIG. 5, it is enough that the user inputs first six figures of the credit card number.

When the server 100 receives the data of the credit card number, it identifies the credit card company from the first figure of the data based on the information stored in the storage section 106. Furthermore, the server 100 identifies the card issuing company from the second to sixth figures of the data.

The user input processing section 102d picks up a card identifier from the card information database 106b based on the identified credit card company and card issuing company.

Furthermore, the user input processing section 102d obtains the corresponding card image data from the card image data file 106a based on the picked-up card identifier. Moreover, the user input processing section 102d obtains the corresponding arrow indication information by from the arrow indication database 106c based on the picked-up card identifier.

At Step SB-4, the card information display processing section 102c of the server 100 produces web data for inputting a credit card number only used for a particular credit card and transmits the web data to the client apparatus. Thus, the webpage for inputting a credit card number only used for the particular credit card is displayed on the monitor of the client apparatus.

Figure 6:
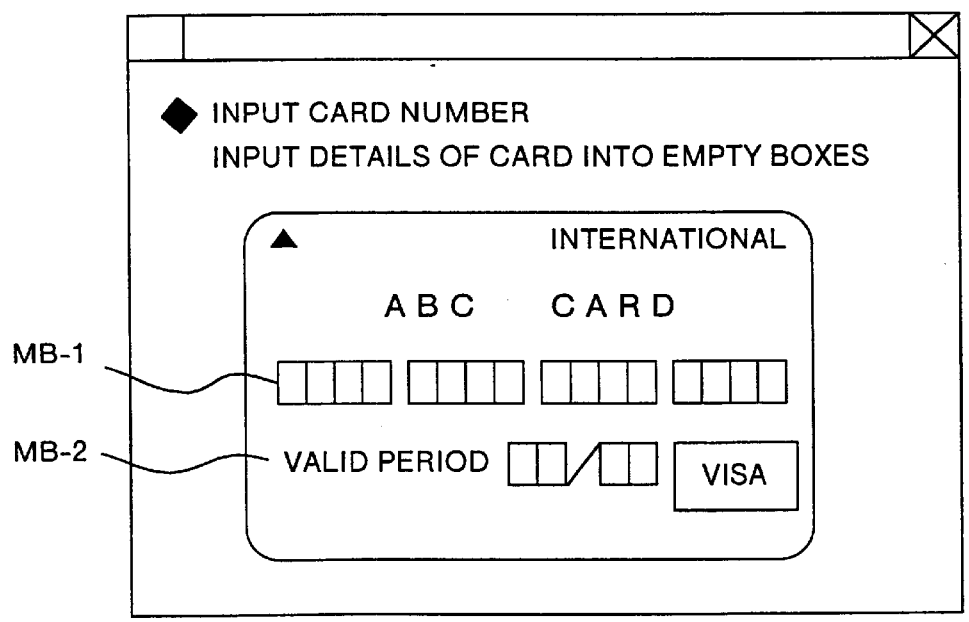
FIG. 6 shows an example of display image of predetermined credit card number inputting webpage which is displayed on the monitor of the client apparatuses 201 to 204.

FIG. 6 shows an example of display on the monitor of the client apparatus. This display includes the area MB-1 for inputting the credit card number, and the area MB-2 for inputting the valid period. Other items may also be displayed.

At Step SB-5, the user inputs remaining figure/s of the credit card number in the area MB-1 and also inputs the valid period of the credit card in the area MB-2. If the user selects an item to be input using the input device, then the item and the arrow indication information for indication the item on question may be overlapped and displayed. When input of information by the user is over, the information is transmitted to the server 100.

Figure 7:
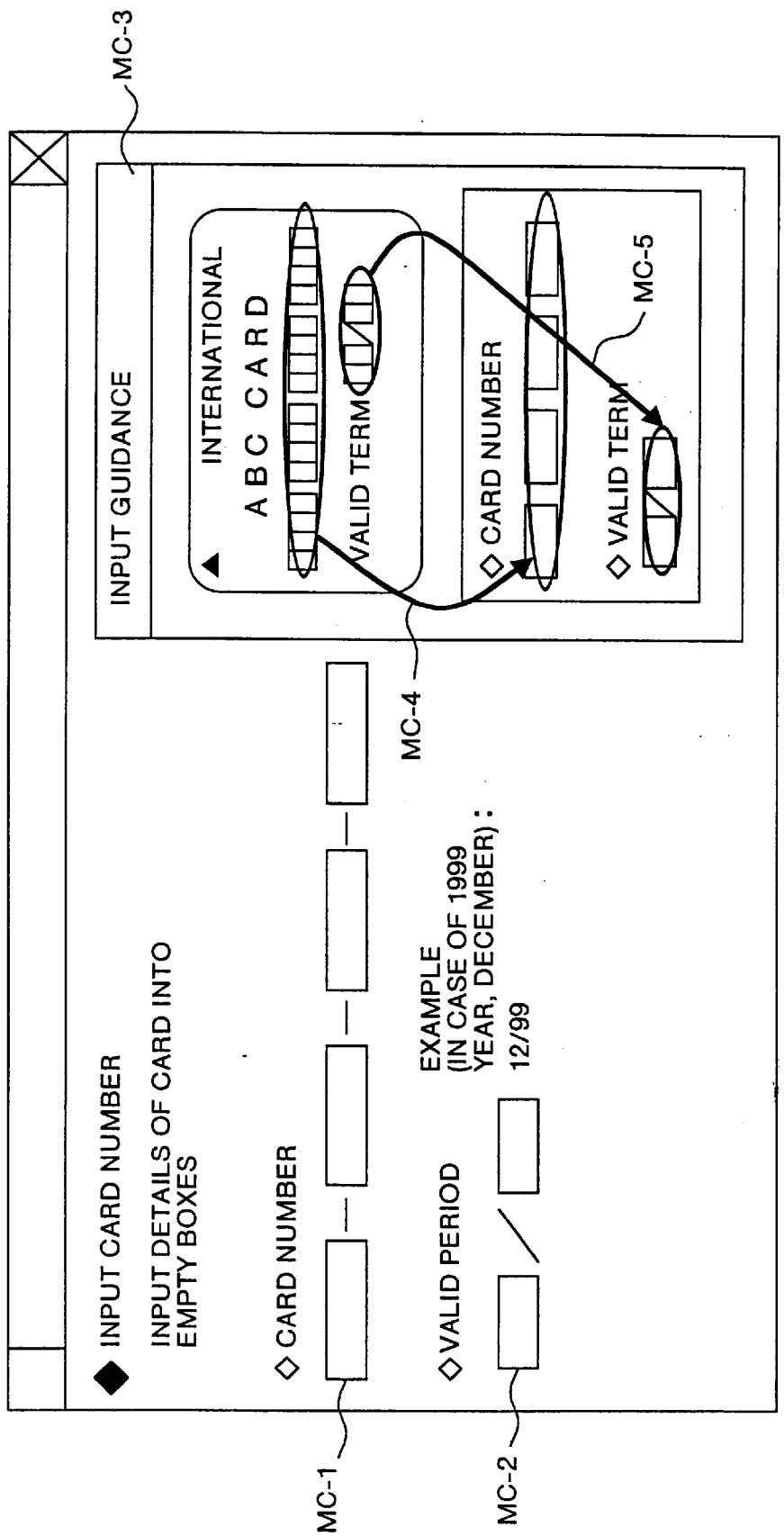
FIG. 7 shows an example of display screen of predetermined credit card number inputting webpage only used as the card which is displayed on the monitor of the client apparatuses 201 to 204.

FIG. 7 shows another example of display on the monitor of the client apparatus. This display includes, in addition to the areas MC-1, MC-2 (which correspond to the areas MB-1, MB-2 in FIG. 6), the area MC-3 that displays a guidance image that assists the user when inputting the data. This guidance image is constructed based on the image data of the credit card and the arrows MC-4, MC-5 based on the arrow indication information. The arrow MC-4 points, to the users, which area on the credit card corresponds to the credit card number input area on the display. Moreover, the arrow MC-5 points, to the users, which area on the credit card corresponds to the valid period input area on the display. Thus, the user easily knows where to input which information. FIG. 7 shows both the arrows MC-4, MC-5, however, only that arrow that is related to the area in which the user is inputting the information may be displayed at one time.

At Step SB-6, the server 100 receives the information like credit card number, valid period from the client apparatus, the card information display processing section 102c produces web data for displaying the obtained information into the image of the credit card, sends the producing web data to the client apparatus.

At step SB-7, the monitor of the client apparatus displays the web data obtained from the server 100. Thus, the user can visually confirm correctness of the information.

Figure 8:
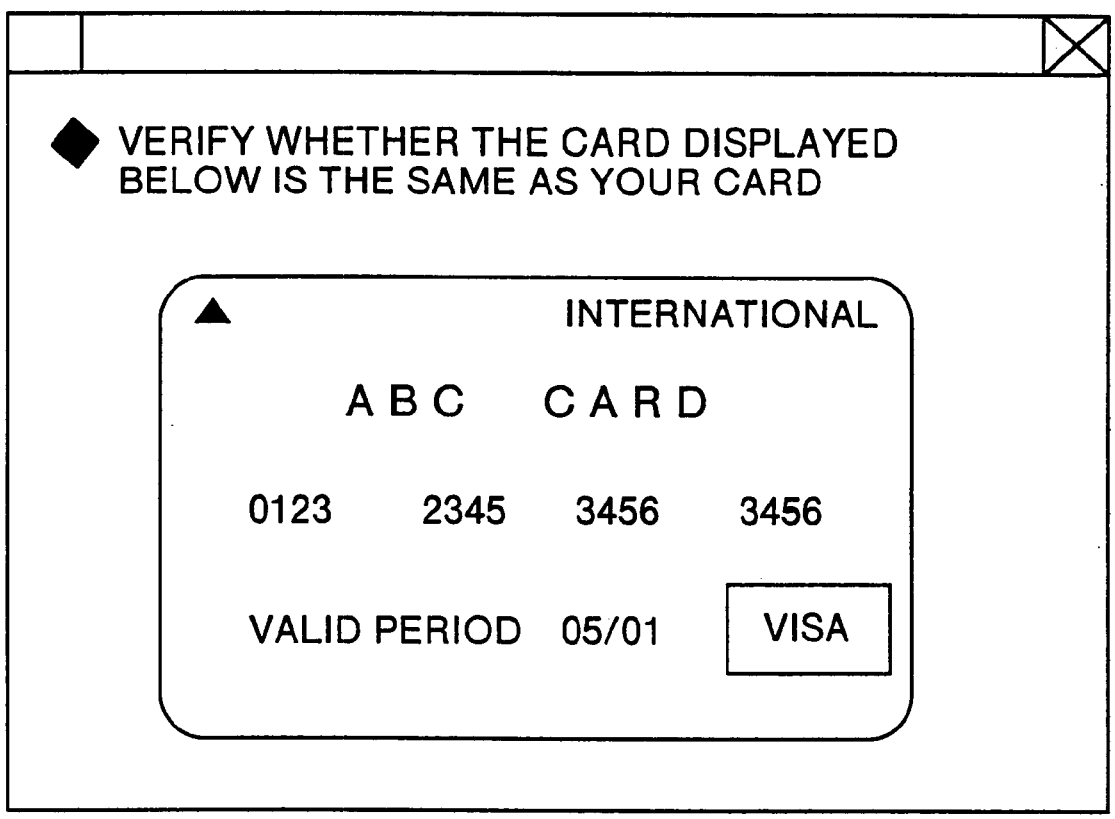
FIG. 8 shows an example of display screen of predetermined credit card number confirming webpage only used as the card which is displayed on the monitor of the client apparatuses 201 to 204.

FIG. 8 shows an example of display on the monitor of the client apparatus. The user can confirm whether the data he/she input is correct by visually checking the display and the information on the credit card.

Further a manual process can replace all or a part of the above-mentioned process capable of being automatically performed. An automatic process can replace all or apart of the above-mentioned process capable of being manually performed.

A processing procedure, a control procedure, a concrete title, information including parameters of various kinds of registration data and searching condition and the like, an example of display image, and a database construction can be discretionally changed.

Furthermore, each of constitutional elements of the server 100 is functional and conceptive. Therefore it is not necessary to physically faithfully construct them as shown. For example, all or an optional part of a processing function of server 100, especially regarding as each processing function in a control section of server 100 can be performed using CPU and a program which the CPU interprets and execute or can be performed as a hardware using wired logic. The program may be stored in a recording medium and read by the server 100 if necessary.

Moreover, the server 100 may be further provided with a pointing device such as a mouse, an input device such as a keyboard, an image scanner, digitizer etc. a display device used for a monitor for inputting data, a clock generator for generating a system clock, and an output device such as a printer. The input device, the display device, and the output device may be connected to the control section 102 by way of input and output interface.

The storage section that store the databases 106*a* to 106*c* may be any memory device such as RAM or ROM, a fixed disk device such as a hard disk drive, a flexible disk, or an optical disk or the like. The storage unit stores various programs, a table, a file, a database, and a file for a webpage and the like.

Further the server 100 can be realized by connecting peripheral devices such as a printer, monitor, or an image scanner to an information processing apparatus such as a personal computer or a workstation and installing required software on the information processing apparatus. It may be enough that only those software that are necessary to realize the method according to the present invention are installed.

Further concrete aspects of integration and/or dispersion of the server 100 are not limited within the attached drawings. The all or the part of the server 100 can be functionally or physically dispersed and integrated by an optional unit corresponding to various load or the like. For example, the server 100 may be independently constructed as a database device, making each of databases independent. A part of the process may be realized using CGI (Common Gateway Interface).

Furthermore, the client apparatuses 201 to 204 can be realized by connecting peripheral devices such as a printer, monitor, and an image scanner to an information processing apparatus such as a personal computer, workstation, game device, Internet connectable TV, PHS (Personal Handy-phone System), a mobile telephone, mobile communications device, or a PDA and by installing necessary software on the information processing apparatus.

All or the part of the control section of each of client apparatuses 201 to 204 can be executed using CPU and a program which the CPU interprets and executes. A computer program for performing various processes can be recorded on a ROM and a hard disk in order to provide a desired command to the CPU in cooperation with an OS (operating system) and perform various processes. This computer program is executed by loading the program into the RAM and the program constitutes a control section in cooperation with CPU.

However this computer program may be recorded into an application program server connected to a desired network with respect to the client apparatuses 201 to 204. All or the part thereof can be downloaded into the server, if necessary. Alternatively all or a desired part of each control section can be performed as a hardware using a wired logic and the like.

A program relating to the present invention can be also stored onto a recording medium capable of being read from a computer. This "recording medium" denotes a desired "portable physical medium" such as a floppy disk, an optical magnetic disk, a ROM, an EPROM, a CD-ROM, an MO, a DVD and the like, a desired "fixed physical medium" such as a ROM, a RAM, a hard disk and the like built in various computer systems, and "communication medium" which can contemporarily hold a program such as a communication line and a carrier wave when transmitting the program by way of a network such as LAN, WAN, and the Internet and the like.

Further a "program" is a method of processing data using a desired language and a described method. Any code format represented by such as a source code or a binary code is available. A "program" is not always limited to a program unitarily constructed. A "program" includes a program dispersed and constructed as a plurality of modules and library. Further "a program" includes a program which attains the function in cooperation with an independent program such as operating system. A concrete construction for reading data from a recording medium can be used with a known construction and a reading procedure, or an installing procedure after reading a program and the like in each of apparatuses described in the above-mentioned embodiments can be used a known procedure.

The network 300 comprises a function for mutually connecting the server 100 to each of the client apparatuses 201 to 204. For example, the network 300 may include the Internet, an intranet, LAN (wired/non-wired), exclusive line net (wired/non-wired), WAN, personal communication net, public telephone net (wired/non-wired), CATV net, portable telephone line changing net/a portable packet changing net such as an IMT client apparatus's system, GSM system or PDC/PDC-P system or the like, wireless call net, local wireless net such as Bluetooth or the like, PHS net, or satellite communication net such as CS, BS, or ISDB or the like. The network 300 can transmit and receive various data by way of a desired network in spite of whether this system is wired or non-wired.

As explained in detail above, according to a method and apparatus of one aspect of the present invention, image data of a card is obtained. Positional information is recognized as to positions of items represented on the card from the obtained card. Input image data are produced for inputting personal information of the user represented on the card of the user's own based on image data and the positional information. A position on image data of the card can be displayed onto the input image. Thus, the user can institutively grasp where and how personal information to be input is printed, so that facility of operation of the user's can be greatly improved. Therefore, input error can be prevented when inputting personal information printed on the card. Further, an input error can be prevented thereby reducing a load of whole of system. Furthermore, fault of convenience of transactions can be avoided owing to lowering of the system.

Furthermore, the image data for displaying a confirmation screen is generated by displaying the personal information input by the user on the input assistance screen on the image data based on the positional information. Furthermore, the card is a credit card.

Furthermore, some starting figures are input from the card number of the credit card; and the image data is decided based on the input figures of the card number.

According to a method and apparatus of another aspect of the present invention, an image data for displaying an input assistance screen, that has been generated by the card information processing apparatus based on an image data of the card and positional information which is an information related to positions of items printed or embossed on the card, is received from the card information processing apparatus. Moreover, the image data for displaying the input assistance screen is displayed. Therefore, input error can be prevented when inputting personal information printed on the card. Further, an input error can be prevented thereby reducing a load of whole of system. Furthermore, fault of convenience of transactions can be avoided owing to lowering of the system.

According to still another aspect of the present invention, there is provided a computer program which when executed realizes the method according to the present invention on a computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of inputting information related to a card, the method being executed on a card information input system, said card information input system including a card information inputting terminal with which an user inputs information related to his/her card and a card information processing apparatus that processes the information related to said card, said card information inputting terminal and card information processing apparatus being connected to each other through a network, the method comprising the steps of:

obtaining image data of said card;

recognizing positional information which is an information related to positions of items printed or embossed on said card from the obtained image data; and generating an image data for displaying an input assistance screen, based on the image data and the positional information, that assists the user when inputting personal information that has been printed or embossed on said card.

2. The card information input method according to claim 1 further comprising the step of generating an image data for displaying a confirmation screen, by displaying the personal information input by the user on the input assistance screen on the image data based on the positional information.

3. The card information input method according to claim 1, wherein said card is a credit card.

4. The card information input method according to claim 3 further comprising the steps of:

inputting some starting figures from the card number of said credit card; and deciding the image data based on the input figures of the card number.

5. A computer program that contains instructions which when executed on a computer causes the computer to realize a method of inputting information related to a card, the method being executed on a card information processing apparatus in a card information input system, said card information input system including a card information inputting terminal with which an user inputs information related to his/her card and said card information processing apparatus that processes the information related to said card, said card information inputting terminal and card information processing apparatus being connected to each other through a network, the method comprising the steps of:

obtaining image data of said card;

recognizing positional information which is an information related to positions of items printed or embossed on said card from the obtained image data;

generating an image data for displaying an input assistance screen, based on the image data and the positional information, that assists the user when inputting personal information that has been printed or embossed on said card; and transmitting the image data for displaying the input assistance screen to said card information processing apparatus.

6. A computer program that contains instructions which when executed on a computer causes the computer to realize a method of inputting information related to a card, the method being executed on a card information inputting terminal in a card information input system, said card information input system including said card information inputting terminal with which an user inputs information related to his/her card and a card information processing apparatus that processes the information related to said card, said card information inputting terminal and card information processing apparatus being connected to each other through a network, the method comprising the steps of:

receiving an image data for displaying an input assistance screen, that has been generated by said card information processing apparatus based on an image data of said card and positional information which is an information related to positions of items printed or embossed on said card, from said card information processing apparatus; and displaying the image data for displaying the input assistance screen.

7. A method of inputting information related to a card, the method being executed on a card information inputting terminal in a card information input system, said card information input system including said card information inputting terminal with which an user inputs information related to his/her card and a card information processing apparatus that processes the information related to said card, said card information inputting terminal and card information processing apparatus being connected to each other through a network, the method comprising the steps of:

receiving an image data for displaying an input assistance screen, that has been generated by said card information processing apparatus based on an image data of said card and positional information which is an information related to positions of items printed or embossed on said card, from said card information processing apparatus; and displaying the image data for displaying the input assistance screen.

8. A card information processing apparatus in a card information input system, said card information input system including a card information inputting terminal with which an user inputs information related to his/her card and said card information processing apparatus that processes the information related to said card, said card information inputting terminal and card information processing apparatus being connected to each other through a network, the card information processing apparatus comprising:

an image data obtaining unit which obtains image data of said card;

a positional information recognizing unit which recognizes positional information which is an information related to positions of items printed or embossed on said card from the image data obtained by said image data obtaining unit;

an image data generating unit which generates an image data for displaying an input assistance screen, based on the image data obtained by said image data obtaining unit and the positional information recognized by said positional information recognizing unit, that assists the user when inputting personal information that has been printed or embossed on said card; and a transmission unit which transmit the image data for displaying the input assistance screen to said card information inputting apparatus.

9. A card information inputting terminal in a card information input system, said card information input system including said card information inputting terminal with which an user inputs information related to his/her card and a card information processing apparatus that processes the information related to said card, said card information inputting terminal and card information processing apparatus being connected to each other through a network, the card information inputting terminal comprising:

an image data for displaying an input assistance screen receiving unit which receives an image data for displaying an input assistance screen, that has been generated by said card information processing apparatus based on an image data of said card and positional information which is an information related to positions of items printed or embossed on said card, from said card information processing apparatus; and a displaying unit which displays the image data for displaying the input assistance screen.

* * * * *